No. 640,130. Patented Dec. 26, 1899.
C. H. HACKETT & C. E. DAILEY.
CENTRIFUGAL LIQUID SEPARATOR.
(Application filed Dec. 6, 1898.)
(No Model.)
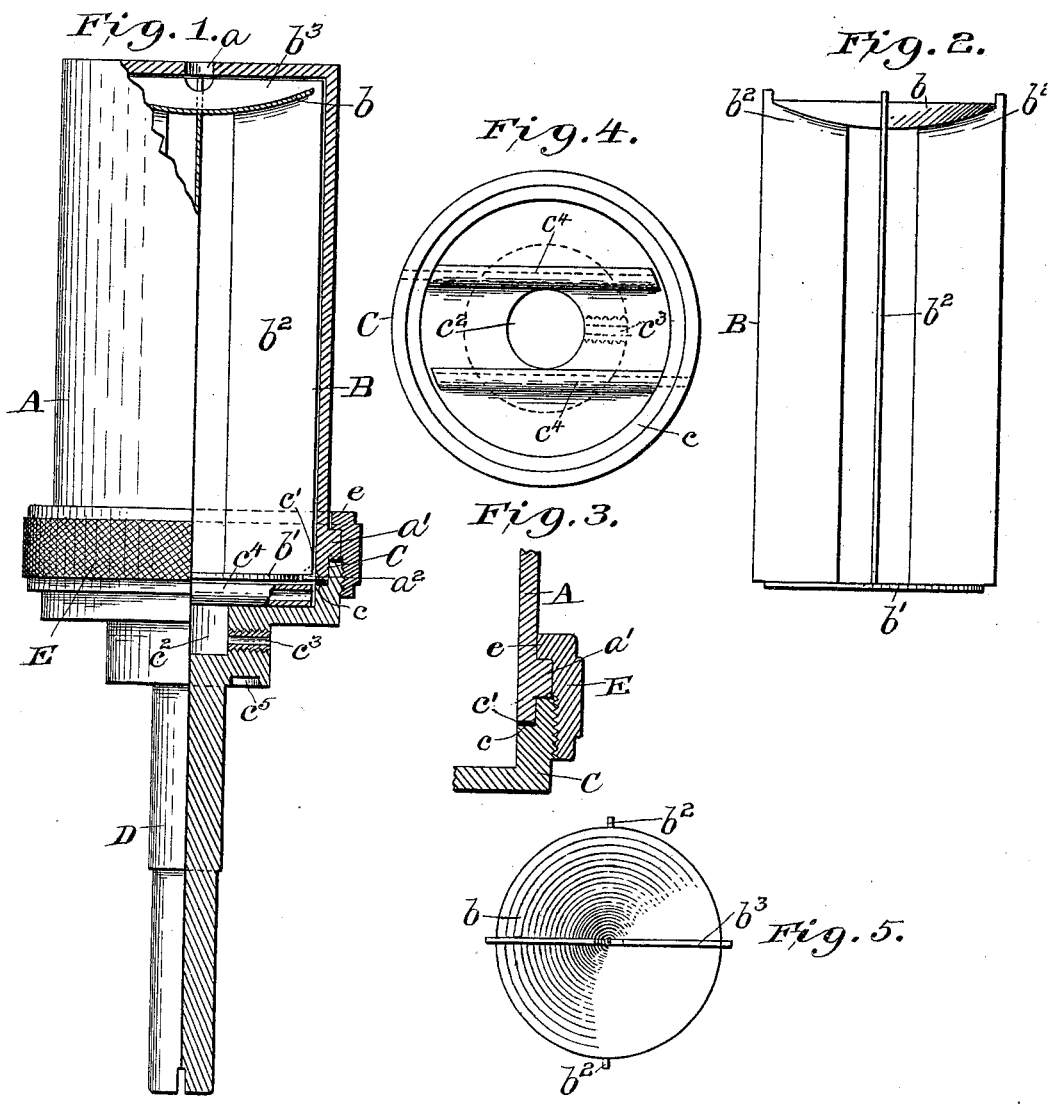
Witnesses
Jos. H. Blackwood
Hartwell P. Heath
Inventors
Charles H. Hackett
Christian E. Dailey
by S. A. Gowick
Attorney

UNITED STATES PATENT OFFICE.

CHARLES H. HACKETT AND CHRISTIAN E. DAILEY, OF WATERLOO, IOWA.

CENTRIFUGAL LIQUID-SEPARATOR.

SPECIFICATION forming part of Letters Patent No. 640,130, dated December 26, 1899.

Application filed December 6, 1898. Serial No. 698,440. (No model.)

*To all whom it may concern:*

Be it known that we, CHARLES H. HACKETT and CHRISTIAN E. DAILEY, citizens of the United States, residing at Waterloo, in the county of Blackhawk and State of Iowa, have invented a certain new and useful Improvement in Centrifugal Liquid-Separators, of which the following is a specification.

Our invention relates to that class of separators in which liquids whose constituents are of different specific gravities are separated by centrifugal force, and has for one of its objects to provide a bowl the separable parts of which may be taken apart and put together readily and easily by hand without tools.

Another object of our invention is to provide a bowl all the parts of which can be easily, readily, and thoroughly cleaned.

Another object of our invention is to provide a bowl into which the greatest possible quantity of the liquid can be put, thereby causing the most perfect and complete separation of the parts by reason of the thickness of the wall of liquid producing great force, while the lighter parts, being discharged from the center, are preserved whole.

Another object of our invention is to provide a bowl adapted to distribute the liquid to the extreme top of the inner surface of the walls of the bowl and to distribute the same equally.

Another object of our invention is to provide a bowl having horizontal discharge-pipes at the bottom thereof.

Another object of our invention is to provide a bowl provided with means to prevent the liquid running into the bearings.

Another object of our invention is to provide a bowl heavier toward the bottom than toward the top and adapted to run easily and steadily in loose bearings at the bottom and without bearings at the top.

These objects we accomplish in the manner and by the means hereinafter more fully described in detail and particularly pointed out in the claims, reference being had to the accompanying drawings, in which like reference-letters indicate like parts in all the figures.

Figure 1 is a side elevation of separator, partly in section. Fig. 2 is a side elevation of core. Fig. 3 is a vertical section showing the joining of the bowl and spindle. Fig. 4 is a top plan view of spindle. Fig. 5 is a top plan view of core. Fig. 6 is a bottom plan view of core.

Our invention consists of a hollow cylinder A, closed at the top, except for a small hole $a$ in the center. At a short distance from the bottom of the cylinder A, on the outside, is an annular ridge $a'$, rectangular in cross-section. On the inside of the cylinder A, at the bottom, is a slotted lug $a^2$. Adapted to fit in said cylinder A is a removable core B, consisting of a concave plate $b$, the concavity upward for its top, a disk $b'$, with a hole in the center for the bottom, and vertical blades $b^2$ connecting said plate $b$ and said disk $b'$ and extending from the inner surface of the cylinder A to the edge of the hole in the disk $b'$. The plate $b$ and the disk $b'$ are slightly smaller in diameter than the inside of the cylinder A. The blades $b^2$ extend a short distance above the plate $b$, and the concavity of the plate $b$ is divided into two or more parts by partition $b^3$, having a semicircular notch in the middle at the top and connecting the projecting ends of the blades $b^2$. The bottom of the cylinder A rests in an annular seat C, the outer surface of which is of the same diameter as the ridge $a'$ and has screw-threads upon it, and the inner surface of which is provided with an annular shoulder $c$, between which and the bottom of the cylinder A a gasket $c'$ is placed. In the center of the bottom of the seat C is a circular recess $c^2$, through the wall of which recess $c^2$ the cream-screw $c^3$ passes. Placed horizontally on the bottom of the seat C, parallel to each other and having the recess $c^2$ between them, are two discharge-pipes $c^4$, each having one end open near the inner surface of the seat C, but on opposite sides, and the other end passing through or connected with a hole in the wall of the seat C. The outer surface of the seat C is reduced in diameter to form the wall of the recess $c^2$ and again reduced to form the spindle D. In the bottom of the outer surface of the recess $c^2$ an annular recess $c^5$, rectangular in cross-section, is formed to prevent the liquid which may run down the outer wall from running into the bearings. A band E, having an annular flange e projecting inwardly from the top and provided with screw-threads on its inner surface and a roughened outer surface, is adapted to slip over the cylinder A, the flange e resting upon the ridge a' and the screw-threads engaging the screw-threads on the seat C. Preferably the parts are made heavier toward the bottom than at the top, causing the bowl to move more steadily, there being only the bearing at the bottom.

The operation of my invention is as follows: The core B is placed in the cylinder A, the concave plate b toward the closed top of the cylinder A and the edge of one of the blades $b^2$ in the slotted lug $a^2$. The gasket c' is placed on the shoulder c in the seat C and the cylinder A placed on the gasket c'. The band E is now placed over the cylinder A and screwed up tight, bringing the parts closely together. The disk b' will now rest on the discharge-pipes $c^4$ and the upper ends of the blades $b^2$ against the top of the inside of the cylinder A. The spindle D being placed in any of the ordinary forms of bearings and a faucet arranged to deliver the liquid into the hole in the top of the cylinder A, the separator is ready for work. The liquid falling into the concavity of the plate b is by the partition $b^3$ and the projecting ends of the blades $b^2$ thrown directly outward against the top of the inside of the cylinder A. As it runs down the side walls, plate b being smaller than the inside of the cylinder A, it can do so equally all around except where the blades $b^2$ touch the inside of the cylinder A. The blades $b^2$ keep it moving evenly with the bowl. The result is that the wall of liquid in the cylinder A grows thicker and thicker, the pressure greater, and the heavier particles are forced gradually outward to the inside of the cylinder A, down which they finally escape to the seat C and are discharged through the pipes $c^4$. The lighter particles of the liquid in the meantime are approaching the center, toward which the pressure grows less and less, until they form a column in the center and fall by gravity into the recess $c^2$ and escape by the cream-screw $c^3$. The separation, by reason of the large quantity of liquid that can be admitted and the consequent greater force exerted, is more perfect and complete than in separators now in use.

Having thus described our invention, what we claim as new, and desire to secure by Letters Patent, is—

1. In a centrifugal liquid-separator, a core having as its bottom a disk with a hole through its center and as its top a concave plate divided into various subdivisions, said plate adapted to receive the liquid as it comes into the bowl and distribute it to the top and sides of said bowl, said bottom and top connected by vertical blades, substantially as shown and described.

2. In a centrifugal liquid-separator provided with a cylindrical bowl closed at one end except for a small central opening, an annular seat adapted to receive and close the open end of the bowl, said seat having in its center a circular recess provided with an outlet for cream and having depending therefrom and made integral therewith a spindle and around said spindle an annular recess rectangular in cross-section, substantially as shown and described.

3. In a centrifugal liquid-separator provided with a cylindrical bowl closed at one end except for a small central opening, an annular seat adapted to receive and close the open end of the bowl and having in its center a circular recess provided with an outlet for cream, said seat provided with horizontal discharge-pipes, one end of each of said pipes opening near the inner wall of said seat and the other end of such pipe through the wall on the opposite side of said seat, said pipes alternating the inner opening from side to side of said seat and adapted to let the skim-milk escape, substantially as shown and described.

4. In a centrifugal liquid-separator, a band provided with an inwardly-projecting flange and interiorly screw-threaded, said band adapted to slip over one part of the bowl, the screw-threads engaging exterior screw-threads on the other part of said bowl and the said flange bearing against a suitable projection, and to draw the two parts together, substantially as shown and described.

5. In a centrifugal liquid-separator, provided with a cylindrical bowl closed at one end except for a small central opening and having around the outside near the open end a ridge rectangular in cross-section, and a seat adapted to receive and close the open end of said bowl, said seat abutting against said ridge and screw-threaded exteriorly, a band provided with an inwardly-projecting flange and interiorly screw-threaded complementary to such seat, said band adapted to slide over said bowl, until said flange abuts against such ridge, substantially as shown and described.

6. In a centrifugal liquid-separator, a cylindrical bowl closed at one end except for a small central opening, and having around the outside near the open end a ridge rectangular in cross-section, a seat adapted to receive and close the open end of said bowl, said seat abutting against said ridge and screw-threaded exteriorly, and a band provided with an inwardly-projecting flange and interiorly screw-threaded, complementary to said seat, said band adapted to slide over said bowl until said flange abuts against said ridge, substantially as shown and described.

7. In a centrifugal liquid-separator, the combination with a closed bowl of a removable core consisting of a plate concave on the upper side for the top, said concavity divided into various subdivisions, a disk with a hole in its center for the bottom and vertical blades connecting said plate and disk, said blades touching the inside and top of said bowl and extending to the edge of the hole in said disk, the plate and disk being slightly smaller in diameter than said bowl, substantially as shown and described.

8. In a centrifugal liquid-separator, a bowl consisting of a hollow cylinder closed at the top except a hole in the center, said cylinder provided near the bottom on the outside with an annular ridge, rectangular in cross-section, and on the inside with a slotted lug, a core having at the bottom a disk with a hole in the center, at the top a plate concave on the upper side, said concavity divided in two or more parts by partitions having a semicircular notch in the center and vertical blades connecting said disk and plate, said blades adapted to extend above said plate to the top of the cylinder, and to slide in said slotted lug, a seat adapted to receive the bottom of said cylinder, said seat having an outside diameter equal to that of said annular ridge and provided on its outer surface with screw-threads, an annular shoulder on its inner surface, a circular recess in the center of its bottom, through the wall of which recess the cream-screw passes and horizontal discharge-pipes on the bottom open at one end near the inside surface of said seat and having an outlet at the other end through the wall of said seat, the outer diameter of said seat being reduced to form the walls of said recess and again to form the spindle and the bottom of said recess around said spindle provided with an annular recess, and a band provided at the top with an annular flange projecting inwardly and adapted to engage said ridge, said band having its inner surface screw-threaded complementary to the screw-threads on said seat and its outer surface roughened, substantially as shown and described.

In testimony whereof we hereto affix our signatures in the presence of two witnesses.

CHARLES H. HACKETT.
CHRISTIAN E. DAILEY.

Witnesses:
LETTIE A. WILSON,
E. V. HAYDEN.